3,398,138
NOVEL CARDENOLIDES AND DERIVATIVES
Yvon Lefebvre, Pierrefonds, Quebec, and Jean-Marie Ferland, Montreal, Quebec, Canada, assignors to American Home Products Corporation, New York, N.Y., a corporation of Delaware
No Drawing. Filed May 24, 1966, Ser. No. 552,389
17 Claims. (Cl. 260—210.5)

ABSTRACT OF THE DISCLOSURE

Novel cardenolides of the general formula

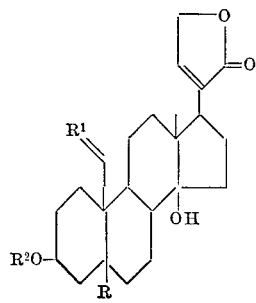

wherein R represents hydrogen or hydroxyl, $R^1$ represents two atoms of hydrogen or oxygen, $R^2$ is hydrogen, a lower aliphatic acyl group containing from two to four carbon atoms or the glucoside residue. The compounds have cardiotonic and mineralocorticoid activity and dosage forms thereof are disclosed. Also disclosed is a process for making the new compounds starting with 17β-[3'-furyl]-substituted androstanes.

---

This invention relates to the preparation of novel cardenolides of the general Formula I, in which R represents hydrogen or hydroxyl, $R^1$ represents two atoms of hydrogen or oxygen, and $R^2$ represents hydrogen, a lower aliphatic acyl group such as, for example, acetate, propionate or butyrate, or a hexoside group such as the glucosyl or a hexosyl group as encountered in naturally occurring glycosides.

Alternatively, the compounds of this invention also may be represented by Formula Ia, in which Z represents rings A, B, and C of the cardenolide structure, together with the substituents attached thereto.

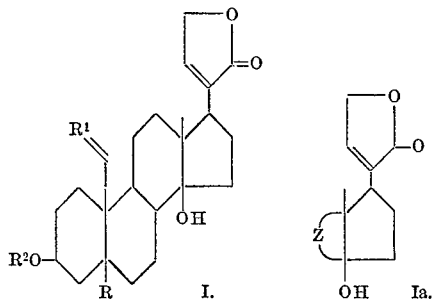

The products of this invention have cardiotonic and mineralocorticoid activity. They may be administered orally in the form of tablets or capsules containing from 1 to 10 mg. of the active ingredients each, or by injection in the form of sterile solutions or suspensions in pharmacologically acceptable vehicles containing from 1 to 10 mg. of the active ingredients per dosage unit.

The novel cardenolides of this invention of Formula I are prepared by treating 17β-[3'-furyl]-substituted androstane derivatives of Formula II in which R represents hydrogen or hydroxyl, $R^1$ represents two atoms of hydrogen, the ethylenedioxy group, or oxygen, and $R^2$ represents a lower aliphatic acyl group, with an N-haloimide or N-haloamide, such as, for example, N-bromosuccinimide, or N-chloroacetamide, or with a hypohalous acid, such as, for example, hypochlorous acid, isolating the reaction product by extraction with a water-immiscible solvent, and purifying it, for example, by chromatography or crystallization. The 3-acyl group of the compounds of Formula I thus obtained may be hydrolyzed to obtain the corresponding 3β-hydroxylated compounds of Formula I, which may in turn be etherified with suitable glucose or hexose derivatives to yield the corresponding 3β-glucosides, or 3β-hexosides as occurring in natural glycosides.

More specifically, we prefer to use as starting materials for the preparation of the novel cardenolides of this invention certain 17β-[3'-furyl]-substituted derivatives of androstane of Formula II in which R represents hydrogen or hydroxyl, $R^1$ represents two atoms of hydrogen or the ethylenedioxy group or oxygen, and $R^2$ represents a lower aliphatic acyl group, such as, for example, the acetyl, propionyl or butyryl group. These compounds may be prepared by the method described by Minato and Nagasaki in Chemistry and Industry, 1965, p. 899, viz, by reduction with diisobutyl aluminium hydride of the appropriate cardenolides of Formula III in which R represents hydrogen or hydroxyl, $R^1$ represents two atoms of hydrogen or the ethylenedioxy group, and $R^2$ represents hydrogen, to obtain the corresponding 17β-[3'-furyl]-substituted androstane derivative of Formula II in which R, $R^1$ and $R^2$ are as defined above. During the course of this reduction it is necessary to protect certain reactive groups such as, for example, the aldehyde group of strophanthidin of Formula II in which R represents hydroxyl, $R^1$ represents oxygen and $R^2$ represents hydrogen. Such temporary protection is advantageously afforded, for example, by the ethylenedioxy group which may be easily introduced by reacting the compound containing a reactive oxo group with ethylene glycol in the presence of a small amount of p-toluenesulfonic acid, and said protective ethylenedioxy group may be readily removed after completion of the reduction by subjecting the ethylenedioxy-substituted compound to hydrolysis with dilute hydrochloric acid in acetone solution as described by Lingner et al. in Arzneimittelforschung, vol. 13, p. 142 (1963).

The preferred starting materials of Formula II in which $R^2$ represents hydrogen, obtained as described above, are then acylated by treating them with the appropriate lower aliphatic acid anhydrides or acyl chlorides in pyridine solution.

The 3-acylated-17β-[3'-furyl]-substituted androstane derivatives of Formula II in which R represents hydrogen or hydroxyl, $R^1$ represents two atoms of hydrogen, the ethylenedioxy group, or oxygen, and $R^2$ represents a lower aliphatic acyl group, obtained as above, are then treated with a reagent which furnishes the elements of a hypohalous acid, such as, hypochlorous or hypobromous acid, upon contact with water. Preferred reagents for this reaction are certain N-haloimides, or N-haloamides, such as, N-chloro- or N-bromo-succinimide or N-chloro or N-bromo-acetamide, used with or without small amounts of perchloric acid. Water must be present, and preferred organic solvents include aliphatic and cyclic ethers, such as, for example diethyl ether, dioxan or tetrahydrofuran; lower aliphatic ketones such as, for example, acetone or methyl ethyl ketone; aromatic hydrocarbons, such as, for example, benzene, toluene, or xylene; lower aliphatic esters, such as, for example, the lower alkyl acetates; lower aliphatic carboxylic acids, such as, for example, acetic or butyric acid; lower aliphatic halogenated hydrocarbons such as, for example, chloroform, methylene chloride, or ethylene dichloride; and lower aliphatic tertiary alcohols such as, for example, t-butanol. Primary and secondary alcohols are not operative and must be excluded. The time of reaction may extend from five minutes to twenty-four hours, and reaction conditions are preferably chosen so as to complete the reaction within one half hour. The temperature range at which the reactions may be carried out is from 0°–50° C., with temperatures of about 20–30° C. being the preferred range. The reaction product is isolated by extraction with a water-immiscible solvent, preferably with ether, washing with water or saturated sodium chloride solution, drying, and evaporating the solvent. The residue is purified by chromatography or by crystallization to yield the desired 23-desoxo-21-oxo-card-20(22)-enolide of Formula I in which R, and $R^2$ are as defined above, and $R^1$ represents two atoms of hydrogen or oxygen.

The above reagent capable of furnishing the elements of a hypohalous acid is employed in substantially equimolar amounts. When two moles of reagent per mole of steroid are used, an intermediate halogenated ketone of Formula IV in which R, $R^1$, and $R^2$ are as defined above and X represents chlorine or bromine is obtained. The latter product may be reduced to the corresponding lactone of Formula I by treatment with zinc in acetic acid.

Alternatively, the same compounds of Formula I are also obtained by treating the starting material, the 3-acylated-17β-[3'-furyl]-substituted androstane derivative of Formula II in which R, and $R^2$ are as defined above, and $R^1$ represents two atoms of hydrogen, the ethylenedioxy group, or oxygen, with substantially equimolar amounts, of a hypohalous acid, preferably hypochlorous or hypobromous acid, under the same conditions as described above, and working up in a similar manner.

When two moles of hypohalous acid per mole of steroid are employed, the intermediate of Formula IV is obtained as above, and may be reduced to the corresponding compound of Formula I as described above.

The above process is generally applicable to 17-[3'-furyl]-substituted steroids of the androstane and estrane series, provided the latter compounds do not contain unprotected primary or secondary alcohol groups or unprotected isolated double bonds.

Such alcohol functions may be protected by esterification or etherification. Isolated double bonds are best protected by bromination.

In its most general form, the reaction may be described by the following formulae, in which St represents a steroids nucleus of the estrane and androstane series with the characteristics cited above attached in position 17 to the furan nucleus, and X represents chlorine or bromine.

As described above, the use of substantially one molar equivalent of N-haloimide or N-haloamide or hypohalous acid per mole of steroid will lead directly from the 17-[3'-furyl]-substituted steroid of Formula IIa to the corresponding lactone of Formula Ia. When substantially two moles of H-haloimide or N-haloamide or hypohalous acid per mole of steroid are used, the intermediate halo-lactone of Formula IVa in which X represents a halogen atom is being obtained, and the latter compound may be reduced with zinc and acetic acid to the lactone of Formula Ia, as described above.

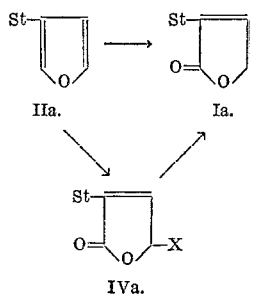

The 23-desoxo-21-oxo-card-20(22)-enolides of Formula I in which R, $R^1$, and $R^2$ are as defined above, obtained as described above, may then be subjected to alkaline hydrolysis, preferably with potassium carbonate in aqueous methanol, to yield the corresponding 3β-hydroxy-23-desozo-21-oxo-card-20(22)-enolides of Formula I in which R and $R^1$ are as defined above, and $R^2$ represents hydrogen.

Furthermore, the 23-desoxo-21-oxo-card-20(22)-enolides of Formula I in which R represents hydrogen or hydroxyl, $R^1$ represents two atoms of hydrogen or oxygen and $R^2$ represents hydrogen, obtained as above, may then be converted to their corresponding 3β-glucosides or 3β-hexosides by reacting them with suitable hexose derivatives, such as, for example, with acetobromoglucose, preferably in dioxan solution, and in the presence of silver oxide and magnesium sulfate, as described by Elderfield et al. in J. Am. Chem. Soc., vol. 69, p. 2235 (1947) or in ethylene dichloride with silver carbonate as described by Zorbach et al. in J. Med. Chem., vol. 6, p. 298 (1963). In this manner when using, for example, acetobromoglucose, there are obtained the corresponding 3β-tetraacetyl-d-glucosides of the above 23-desoxo-21-oxo-card-20(22)-enolides of Formula I in which R and $R^1$ are as defined above, and $R^2$ represents the tetraacetylglucosyl group. The latter compounds may then be deacetylated, preferably with barium methoxide as described by Elderfield et al. cited above, to obtain the corresponding 3β-d-glucosides of the 23-desoxo-21-oxo-card-20(22)-enolides of Formula I in which R and $R^1$ are as defined above, and $R^2$ represents a d-glucosyl group.

The following formulae and examples in which R, $R^1$, and $R^2$ are as defined above, will illustrate this invention.

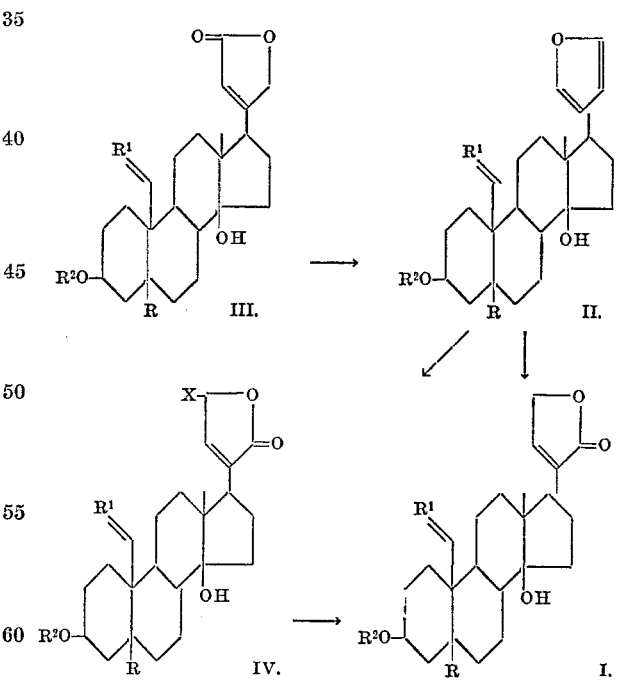

Example 1

A 25.5% solution of diisobutyl aluminum hydride in dry tetrahydrofuran (72 ml.) is added dropwise to a solution of digitoxigenin (15 g.) in tetrahydrofuran (200 ml.) at a temperature between −20 and −25° C. in an atmosphere of nitrogen. The reaction mixture is stirred for an additional 20 minutes at the same temperature. A 10% aqueous sulfuric acid solution (50 ml.) is added and the mixture is poured into an aqueous 5% sodium bicarbonate solution. After filtering through celite, the mixture is extracted with ether. The ether extract is washed with water, dried and evaporated to dryness leaving crude 17β-[3'-furyl]-androstane-3β,14β-diol, purified by crystallization from methylene chloride-ether to M.P. 201–203° C.

Similarly, periplogenin yields upon reduction 17β-[3'-furyl]-androstane-3β,5β,14β-triol.

In a similar manner, the 19-ethylenedioxy derivative of strophanthidin yields 19 - ethylenedioxy - 17β - [3'-furyl]-androstane-3β,5β,14β-triol when reduced with diisobutyl aluminum hydride. Upon treatment with 0.1 N hydrochloric acid in acetone solution the latter compound is hydrolyzed to 17β - [3'-furyl]-3β,5β,14β-trihydroxyandrostan-19-al.

Example 2

A solution of 17β-[3'-furyl]-5β-androstane-3β,14β-diol (10 g.) obtained as described in Example 1, pyridine (50 ml.) and acetic anhydride (25 ml.) is allowed to stand at room temperature overnight. Methanol (25 ml.) is added and the solution is poured into ice-water and ether extracted. The ether is washed with dilute sulfuric acid, sodium bicarbonate and water. After drying and evaporating the solvent the crude acetate is crystallized from aqueous methanol to yield pure 3β-acetoxy-17β-[3'-furyl]-5β-androstan-14β-ol, M.P. 155–157° C. Similarly, acetylation of 17β-[3'-furyl]-androstane-3β,5β,14β-triol and 17β-[3'-furyl]-3β,5β,14β-trihydroxyandrostan-19-al yields the corresponding 3β-acetoxy-17β-[3'-furyl]-androstane-5β,14β - diol and 3β - acetoxy - 5β,14β-dihydroxy-17β-[3'-furyl]-androstan-19-al, respectively.

Example 3

By a similar procedure as described in Example 2, acylation with the appropriate acid anhydrides or acyl chlorides such as, for example, propionic anhydride or butyryl chloride of 17β-[3'-furyl]-5β-androstane-3β,14β-diol, 17β-[3'-furyl]androstane-3β,5β,14β-triol and 17β-[3'-furyl]-3β,5β,14β-trihydroxyandrostan-19-al yields the corresponding 3-acylates, 3β-propionyloxy or 3β-butyryloxy-17β-[3'-furyl]-5β-androstan-19β-ol, or 3β-propionyloxy or 3β - butyryloxy - 17β-[3'-furyl]-androstane-5β,14β-diol or 3β-propionyloxy- or 3β-butyryloxy-17β-[3'-furyl]-5β,14β-dihydroxyandrostan-19-al, respectively.

Example 4

N-bromosuccinimide (900 mg.) is added portionwise to a stirred solution of 3β-acetoxy-17β-[3'-furyl]-5β-androstan-14β-ol (2 g.) in dioxane (100 ml.) and water (8 ml.), and the reaction is allowed to proceed for 30 minutes at room temperature. The solution is diluted with water and ether extracted. The ether extracts are washed with water, dried and evaporated. The residue is chromatographed on silica gel, and the fractions eluted with benzene-ether (3:1) are combined and crystallized from mixtures of methylene chloride-ether to yield pure 3β-acetoxy - 23 - desoxo-14-hydroxy-21-oxo-5β-card-20(22)-enolide M.P. 172–173° C. Similarly, 3β-acetoxy-17β-[3'-furyl]-androstane-5β,14β-diol and 3β-acetoxy-5β,14β-dihydroxy-17β-[3'-furyl]-androstan-19-al yield, respectively, 3β - acetoxy 23 - desoxo - 5β,14 - dihydroxy-21-oxocard-20(22) - enolide and 3β - acetoxy - 23 - desoxo-5β,14-dihydroxy - 19,21 - dioxocard-20(22)-enolide when treated with N-bromosuccinimide.

The same products as described above are also obtained when using equivalent amounts of N-chlorosuccinimide instead of N-bromosuccinimide, and allowing the reaction to proceed as above for approximately five hours.

Alternatively, the same compounds as described above are also obtained when adding 0.8 ml. of water and 0.04 ml. of glacial acetic acid to a solution of 200 mg. of the same starting materials as described above, then adding dropwise an aqueous solution of sodium hypochlorite (1.44 M, 0.5 ml.), stirring at room temperature for approximately one hour, and working up as described above.

Example 5

In the same manner as described in Example 4, the 3-acylates such as the 3-propionates and 3-butyrates of 17β-[3' - furyl] - 5β - androstane - 3β,14β-diol, 17β-[3'-furyl]-androstane-3β,5β,14β-triol and 17β-[3'-furyl]-3β,5β,14β-trihydroxyandrostan-19-al are treated with N-bromosuccinimide to yield the 3-acylates, such as, for example, the 3-propionates and 3-butyrates of 23-desoxo-3β,14-dihydroxy - 21 - oxo-5β-card-20(22)-enolide, 23-desoxo-21-oxo - 3β,5β,14 - trihydroxycard - 20(22) - enolide and 23-desoxo - 19,21 - dioxo - 3β,5β,14-trihydroxycard-20(22)-enolide, respectively.

Example 6

A solution of 3β-acetoxy-23-desoxo-14-hydroxy-21-oxo-5β-card-20(22)-enolide (200 mg.), potassium carbonate (200 mg.) methanol (8 ml.) and water (2 ml.) is refluxed for two hours. After cooling, the solution is acidified with acetic acid, diluted with water and extracted with a mixture of methylene chloride and ethyl acetate. The organic solvents are washed with water, dried, and evaporated, yielding 23 - desoxo - 3β,14 - dihydroxy - 21 - oxo-5β-card-20(22)-enolide, characterized by infrared absorption bands at 3595 cm.$^{-1}$; 1745 cm.$^{-1}$, and 1645 cm.$^{-1}$. Similarly, 3β - acetoxy-23-desoxo-5β,14-dihydroxy-21-oxocard-20(22) - enolide and 3β - acetoxy - 23 - desoxo - 5β,14-dihydroxy-19-21-dioxocard-20(22)-enolide are hydrolyzed to yield, respectively, 23-desoxo-21-oxo-3β,5β,14-trihydroxycard - 20(22) - enolide and 23 - desoxo-19,21-dioxo-3β,5β,14-trihydroxycard-20(22)-enolide.

In a similar manner, the 3-propionates and 3-butyrates of 23 - desoxo - 3β,14 - dihydroxy-21-oxo-5β-card-20(22)-enolide, 23 - desoxo - 21 - oxo - 3β,5β,14 - trihydroxycard-20(22) - enolide and 23 - desoxo-19,21-dioxo-3β,5β,14-trihydroxycard-20(22)-enolide obtained as described in Example 5, yield upon hydrolysis 23 - desoxo - 3β,14 - dihydroxy - 21 - oxo-5β-card-20(22)-enolide, 23-desoxo-21-oxo - 3β,5β,14 - trihydroxycard - 20(22) - enolide, and 23-desoxo - 19,21 - dioxo - 3β,5β,14 - trihydroxycard-20(22)-enolide, respectively.

Example 7

23 - desoxo-3β,14-dihydroxy-21-oxo-5β-20(22)-enolide (375 mg.) obtained as described in Example 6, dissolved in 10 ml. dry dioxan, is stirred at room temperature with 500 mg. dry silver oxide and 1 g. anhydrous magnesium sulfate. A solution of 820 mg. acetobromoglucose is added over a period of one hour, and stirring is continued for 24 hours at room temperature. After working up as described by Elderfield et al. cited above, 23-desoxo-3β,14-dihydroxy - 21 - oxo - 5β-card-20(22)-enolide-3-β-d-tetraacetyl-glucoside is obtained.

In the same manner, but using 23 - desoxo - 21 - oxo-3β,5β,14 - trihydroxycard - 20(22) - enolide or 23-desoxo-19,21 - 3β,5β,14 - trihydroxycard - 20(22) - enolide instead of 23 - desoxo - 3β,14 - dihydroxy - 21 - oxo-5β-card-20(22)-enolide, the corresponding tetraacetyl-β-d-glucosides, viz, 23 - desoxo - 21 - oxo-3β,5β-14-trihydroxycard-20(22)-enolide-3-β-d-tetraacetyl-glucoside and 23-desoxo-19,21 - dioxo - 3β,5β,14 - trihydroxycard-20(22)-enolide-3-β-d-tetraacetyl-glucoside, are respectively obtained.

By hydrolysis of the 3-β-d-tetraacetyl-glucosides obtained above, in dry methanol with approximately 0.05 N barium methoxide following the procedure described by Elderfield et al., cited above, 23-desoxo-3β,14-dihydroxy-21 - oxo - 5β - card - 20(22) - enolide - 3-β-d-glucoside, 23-desoxo - 21-oxo-3β,5β,14-trihydroxy-card-20(22)-enolide-3-β-d-glucoside, and 23-desoxo-19,21-dioxo-3β,5β,14-trihydroxycard - 20(22) - enolide-3-β-d-glucoside are respectively obtained.

Example 8

To 3β-acetoxy-17β-[3'-furyl]-5β-androstan-14-ol, obtained as described in Example 2 (0.200 g.) in dioxan (10 ml.), and water (0.8 ml.), is added portionwise N-bromosuccinimide (0.180 g.), and the mixture is stirred at room temperature for one-half hour. The solution is diluted with ether, washed with saturated sodium chloride solution, dried and evaporated. The oily residue contains 3β-acetoxy-23-bromo-14-hydroxy-23-desoxo-21 - oxo - 5β-cardenolide, characterized by NMR spectroscopy with characteristic peaks at 6.91 p.p.m. and 7.18 p.p.m.

The above oily residue is stirred in acetic acid (20 ml.), with zinc (2.2 g.), for a period of one-half hour. The zinc powder is then removed by filtration and the filtrate diluted with chloroform. The organic layer is washed with water till neutral, dried, and evaporated, to leave 3β-acetoxy-14-hydroxy-23-desoxo-21-oxo-5β - cardenolide, identical with the product described in Example 4.

In the same manner, but using N-chlorosuccinimide instead of N-bromosuccinimide, 3β-acetoxy-23-chloro-14-hydroxy-23-desoxo-21 - oxo - 5β - cardenolide is obtained from which 3β-acetoxy-14-hydroxy-23-desoxo-21-oxo-5β-cardenolide is obtained in the same manner as described above.

We claim:

1. A compound of the formula

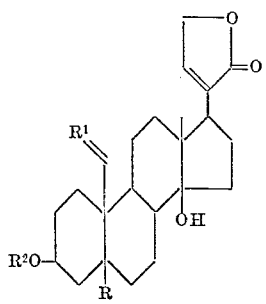

wherein R is selected from the group which consists of hydrogen and hydroxyl; R¹ is selected from the group which consists of two atoms of hydrogen and oxygen; and R² is selected from the group which consists of hydrogen, lower aliphatic acyl groups containing from two to four carbon atoms and the glucoside residue.

2. 3β - acetoxy - 23 - desoxo - 14 - hydroxy - 21 - oxo-5β-card-20(22)-enolide, as claimed in claim 1.

3. 3β - acetoxy - 23 - desoxo - 5β,14 - dihydroxy - 21-oxocard-20(22)-enolide, as claimed in claim 1.

4. 3β - acetoxy - 23 - desoxo - 5β,14 - dihydroxy - 19,21-dioxocard-20(22)-enolide, as claimed in claim 1.

5. 23 - desoxo - 3β,14 - dihydroxy - 21 - oxo - 5β - card-20(22)-enolide, as claimed in claim 1.

6. 23 - desoxo - 21 - oxo - 3β,5β,14 - trihydroxycard-20(22)-enolide, as claimed in claim 1.

7. 23 - desoxo - 19,21 - dioxo - 3β,5β,14 - trihydroxycard-20(22)-enolide, as claimed in claim 1.

8. 23 - desoxo - 3β,14 - dihydroxy - 21 - oxo - 5β - card-20(22)-enolide 3-β-d-tetraacetyl-glucoside, as claimed in claim 1.

9. 23 - desoxo - 21 - oxo - 3β,5β,14 - trihydroxycard-20(22)-enolide 3-β-d-tetraacetyl-glucoside, as claimed in claim 1.

10. 23 - desoxo - 19,21 - dioxo - 3β,5β,14 - trihydroxycard - 20(22) - enolide 3 - β - d - tetraacetyl-glucoside, as claimed in claim 1.

11. 23 - desoxo - 3β,14 - dihydroxy - 21 - oxo-5β-card-20(22)-enolide 3-β-d-glucoside, as claimed in claim 1.

12. 23 - desoxo - 21 - oxo -3β,5β,14-trihydroxycard-20(22)-enolide 3-β-d-glucoside, as claimed in claim 1.

13. 23 - desoxo - 19,21 - dioxo - 3β,5β,14 - trihydroxycard - 20(22) - enolide 3 - β - d - glucoside, as claimed in claim 1.

14. 3β - acetoxy - 23 - bromo - 14 - hydroxy-23-desoxo-21-oxo-5β-cardenolide.

15. The process which comprises treating a compound of the formula

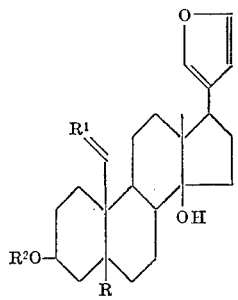

wherein R is selected from the group consisting of hydrogen and hydroxyl; R¹ is selected from the group consisting of two hydrogen atoms, ethylenedioxy and the oxo group; and R² is a lower aliphatic acyl group; with substantially one molar equivalent of a reagent selected from the group which consists of N-haloimides, N-haloamides and hypohalous acids, thereby obtaining a compound of the formula

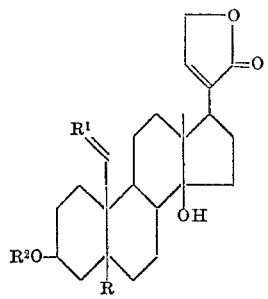

in which R, R² have the above-defined significance and R¹ is selected from the group consisting of two atoms of hydrogen and oxygen.

16. The process which comprises treating a compound of the formula

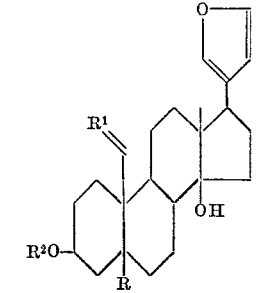

wherein R is selected from the group consisting of hydrogen and hydroxyl; R¹ is selected from the group consisting of two hydrogen atoms, ethylenedioxy, and the oxo group; and R² represents a lower aliphatic acyl group with substantially two molar equivalents of a reagent selected from the group which consists of N-haloimides, N-haloamides and hypohalous acids, thereby obtaining a compound of the formula

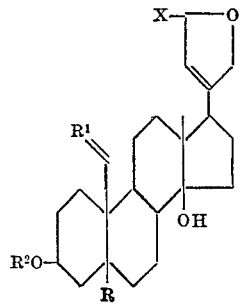

wherein R and R² have the significance above defined, R¹ is selected from the group consisting of two atoms of hydrogen and oxygen, and X is selected from the group which consists of chlorine and bromine.

17. The process which comprises treating a compound of the formula

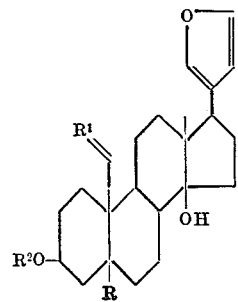

wherein R is selected from the group consisting of hydrogen and hydroxyl; R¹ is selected from the group consisting of two hydrogen atoms, ethylenedioxy, and the oxo group; and R² represents a lower aliphatic acyl group with substantially two molar equivalents of a reagent selected from the group which consists of N-haloimides, N-haloamides and hypohalous acids, thereby obtaining a compound of the formula

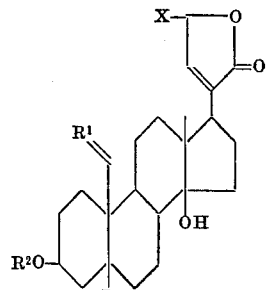

wherein R and R² have the significance above defined, R¹ is selected from the group consisting of two atoms of hydrogen and oxygen, and X is selected from the group which consists of chlorine and bromine, and dehalogenating the latter compound with zinc and acetic acid to obtain a compound of the formula

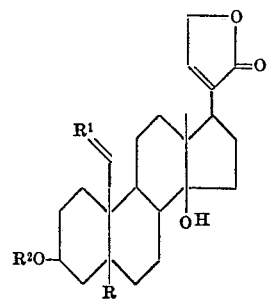

in which R, R¹ and R² have the significance defined above.

References Cited

UNITED STATES PATENTS 2,968,596  1/1961   Meister et al. _____ 260—239.57
3,177,200  4/1965   Meyer _____ 260—210.5
3,211,719  10/1965  Von Wartburg et al. _ 260—210.5

LEWIS GOTTS, *Primary Examiner.*

E. G. LOVE, *Assistant Examiner.*